Jan. 13, 1959    A. M. MAYO ET AL    2,868,959
MOISTURE-PROOF ILLUMINATED INSTRUMENT
Filed June 29, 1955    2 Sheets-Sheet 1

INVENTORS
ALFRED M. MAYO
JAMES P. NOLAN
HAROLD L. WALPOLE

BY George J. Rubens
ATTORNEYS

Jan. 13, 1959    A. M. MAYO ET AL    2,868,959
MOISTURE-PROOF ILLUMINATED INSTRUMENT
Filed June 29, 1955    2 Sheets-Sheet 2

INVENTORS
ALFRED M. MAYO
JAMES P. NOLAN
HAROLD L. WALPOLE
BY
George J. Rubens
ATTORNEYS

2,868,959
MOISTURE-PROOF ILLUMINATED INSTRUMENT

Alfred M. Mayo, Palos Verdes Estates, Harold L. Walpole, Redondo Beach, and James P. Nolan, Malibu, Calif., assignors, by mesne assignments, to the United States of America as represented by the Secretary of the Navy Application June 29, 1955, Serial No. 519,013

3 Claims. (Cl. 240—2.1)

The present invention relates to an instrument cover illuminating means and more particularly to a new and novel instrument cover illuminating means wherein the conductors supplying electrical energy to the illuminating means comprise thin layers of a metallic substance, one of such conductors also serving to provide a hermetic seal between an instrument cover and an instrument housing.

In order to illuminate an instrument dial efficiently such that uniform illumination is obtained and a minimum of glare reaches the observer's eyes, it is desirable to provide a central illuminating fixture in the cover of the dial. Such constructions are well known in the prior art as shown for example in U. S. Patent #2,172,765.

In many of the instruments utilized in aircraft, for example, the housing of the instrument must be hermetically sealed which necessarily requires that a hermetic seal be provided between the transparent cover at one end of the housing and the housing itself. The indicating dial of the instrument is necessarily mounted adjacent the transparent cover in order that it may be illuminated by the lighting fixture and is also readily visible to an observer.

The present invention provides an arrangement wherein a permanent hermetic seal is provided between the instrument cover and the instrument housing in such a manner that the electric bulb in the illuminating fixture may be quickly and easily replaced or the fixture itself may be repaired without affecting the hermetic seal.

The conductors of the present invention are in the form of thin layers of metallic substances in conjunction with thin metallic wires whereby the conductors may be secured to the cover in a simple manner. One of the conductors also serves as a seal between the instrument cover and housing, thereby providing an effective seal which will withstand pressures in excess of two and one-half atmospheres and will not deteriorate with wear.

An object of the present invention is the provision of a new and novel instrument cover illuminating means wherein the instrument cover and the illuminating fixture form a permanent hermetic seal relative to the housing capable of withstanding pressures in excess of two and one-half atmospheres.

Another object is to provide an instrument cover illuminating means wherein the conductors thereof are easily installed and are relatively foolproof in operation.

A further object of the invention is the provision of an instrument cover illuminating means which is simple and inexpensive in construction, yet sturdy and reliable in service.

Other objects and many of the attendant advantages of this invention will be readily appreciated as the same becomes better understood by reference to the following detailed description when considered in connection with the accompanying drawings wherein.

Figure 1:
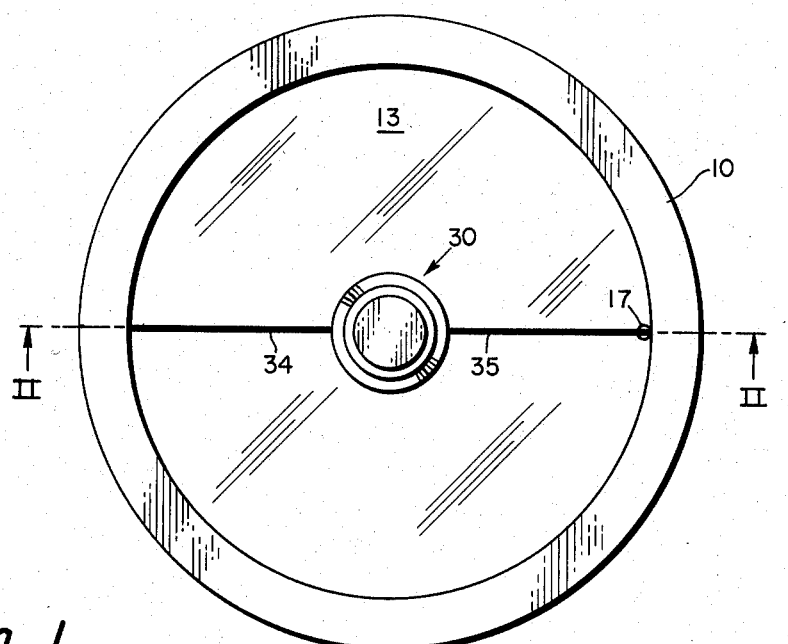
Fig. 1 is a top plan view of the invention device.
Figure 2:
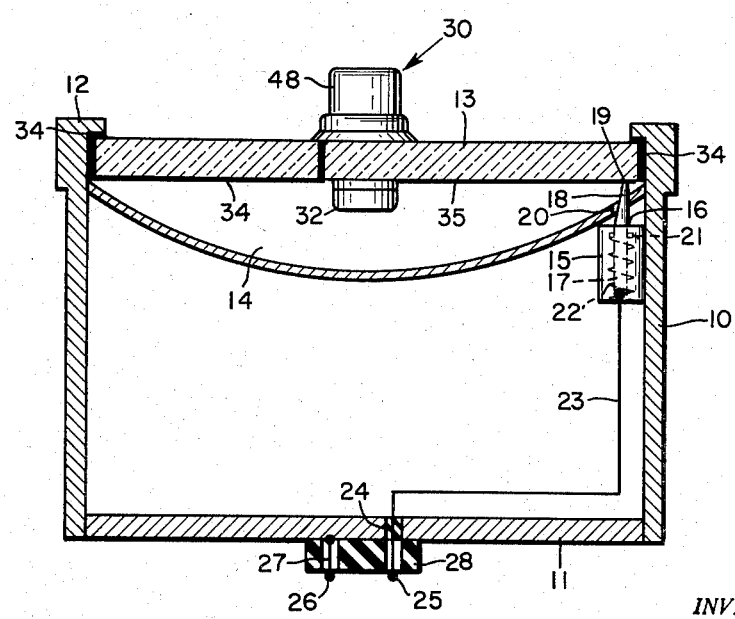
Fig. 2 is a somewhat schematic elevation partly in section of the device taken along line II—II of Fig. 1.

Referring now to Figs. 1 and 2 of the drawings, there is shown a hollow cylindrical instrument housing 10 formed of a metallic substance and being suitably closed at the rear end thereof by a closure member 11 formed of the same substance as housing 10. A conventional means such as a hollow conduit or flexible cable (not shown) may be connected in any suitable manner to member 11 such that it is in communication with the interior of the housing whereby the signals which are to be measured may be transmitted to the mechanism of the instrument.

The opposite front end of housing 10 is provided with a circumferential flange 12 against which is seated a transparent cover member 13 formed of glass, plastic or the like. The manner in which cover 13 is mounted within housing 10 will be hereinafter more fully described. An indicating dial as illustrated schematically at 14 may comprise any conventional dial such as a speed indicator, altimeter or the like. It should be noted that whereas conventional dial faces generally have a flat configuration, such a construction would result in uneven light intensity distribution when utilized with a central lighting fixture as in the present invention, and accordingly a special dial shape is required to give a more even light intensity distribution. The optimum shape of the dial would make the use of a moving pointer difficult and consequently a compromise may be effected by forming the surface of revolution of the dial as a portion of a sphere. It is evident that the shape of the dial may vary according to various design considerations. It should be understood that the indicating and measuring mechanism of the instrument would be mounted within housing 10, but such mechanism has not been shown for the sake of clarity and due to the fact that the invention is not related thereto.

A small hollow receptacle 15 formed of insulating material such as micarta or the like is secured to the inner surface of housing 10 and has a circular opening 16 formed in the top thereof. A cylindrical contact 17 formed of a metallic substance is slidably mounted within the receptacle and has a cut-away portion 18, the tip 19 of which is adapted to engage an electrical conductor secured to the lower surface of cover 13. The upper portion of contact 17 passes freely through a complementary opening 20 formed through the dial. Contact 17 has a circumferential shoulder 21 secured thereto and a compression spring 22 is positioned around the contact between shoulder 19 and the bottom of receptacle 15 such that the contact is normally urged upward into engagement with the conductor secured to the lower surface of the cover.

As shown schematically, an electrical lead 23 is connected at one end to contact 17 and passes through an insulating portion 24 provided in closure 11 and is connected at its other end to a terminal 25. Insulator 24 insures that the hermetic seal within the housing is maintained at all times. A second terminal 26 is connected by a lead 27 to closure 11 and thereby to the housing, and it may be observed that leads 23 and 27 pass through suitable openings in an electrical connector 28 of conventional design which is adapted for connection to a suitable source of electrical energy such as a battery or the like. Terminal 25 is adapted to be connected to the positive terminal of a battery and terminal 26 is adapted to be connected to the negative terminal of a battery.

Figure 3:
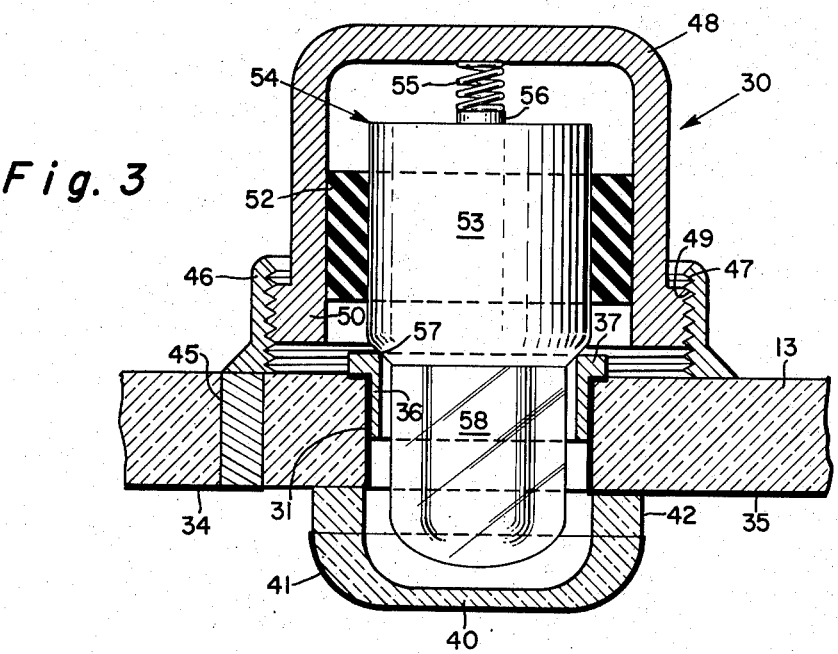
Fig. 3 is an enlarged cross-sectional view of a portion of the device shown in Fig. 2.

The illuminating fixture indicated generally by reference number 30 is mounted in the center of cover 13, and referring more particularly to Fig. 3 it may be seen that the cover has a circular opening 31 formed through the center thereof. The cover may be in the order of 1/8" in thickness and the electrical conductors secured to the lower surface of the cover comprise thin layers of a metallic substance such as platinum or the like on the order of .015 inch in thickness. These conductors as seen in Fig. 1 extend radially outward from the center of the cover, and a first conductor 34 extends from the central portion of the cover to the outer periphery of the cover in a narrow strip, this strip being contiguous with a similar coating which extends entirely around the outer periphery of the cover and also extends circumferentially about the upper edge of the cover as may more clearly be seen in Fig. 2. A second conductor 35 is dispersed completely around the inner periphery of opening 31 and extends outwardly in a narrow strip from the center portion of the cover but is spaced at the outer end thereof from the outer periphery of the cover by a small gap such that a short circuit between conductors 34 and 35 is prevented. The cover is so positioned that contact 17 engages conductor 35 as shown in Fig. 1. The conductors may be composed entirely of a thin metallic layer as described above but are preferably supplemented by a metallic wire for example formed of silver on the order of .01 inch diameter which may be soldered to the conductor, thereby insuring that the conductor will remain intact when subjected to excessive voltages or physical forces.

That portion of conductor 34 which is deposited on the outer periphery of cover 13 and circumferentially about the upper edge of the cover also serves to hermetically seal the cover to the housing. This is accomplished by first depositing conductors 34 and 35 to the cover in a well-known manner such that they are disposed on and about the cover as previously described. The cover is then inserted from the opposite end of the housing until it is resting on flange 12. The entire assembly is then placed in an oven where it is subjected to high temperatures which melt the coating and bond it to the inner surface of the housing, thereby permanently sealing the cover to the housing. In order to facilitate and insure a good seal, additional solder or similar material may be coated about the outer periphery of the cover and along the upper edge thereof. It is evident that conductive materials other than solder may be utilized, especially where it would enable the employment of lower temperature bonding methods.

A hollow ring-shaped grommet 36 fits snugly within opening 31 in cover 13 and has a circumferential shoulder 37 formed integral with the top portion thereof adapted to engage the upper surface of the cover. It is evident that the outer surface of the grommet is in engagement with that portion of conductor 35 which is deposited around the inner surface of opening 31.

A cup-shaped portion 40 is soldered or otherwise suitably connected to the lower surface of cover 13 and completely surrounds opening 31 thereby providing a hermetic seal relative to the opening. It should be noted that conductor 35 extends under member 40 such that electrical connection through lead 35 is not interrupted. Member 40 is formed of a suitable transparent material such as glass, plastic or the like and has an opaque metallic coating 41 such as platinum extending around the lower area thereof such that only a narrow circumferentially extending area 42 which is preferably frosted will emit light from a bulb disposed within the fixture. Translucent portion 42 provides direct illumination to the edges of the face of the instrument dial.

An opening 45 is formed longitudinally through cover 13 and is filled with a metallic conductor such as solder whereby an electrical connection is provided between the end of conductor 34 and a support member 46 soldered to the upper surface of the cover. The support member is a hollow cylindrical metallic member which has screw threads 47 formed on the inner surface thereof. A metallic cap 48 of generally cup-shaped configuration has screw threads 49 formed on the outer surface of a flange 50 at the lower end thereof such that cap 48 may be threaded into support member 46. A cylindrical bushing 52 is suitably mounted on the inner surface of cap 48 and has an opening formed therethrough adapted to tightly engage the outer surface of the body 53 of a bulb 54. A spring contact 55 is secured to the inner end of cap 48 and engages the conventional contact 56 formed on the end of the bulb. An electrical connection is provided between grommet 36 and shoulder 57 formed on the metallic body 53 of the bulb. The incandescent portion of the bulb is surrounded by a glass portion 58 which is preferably coated with a material which filters the light in a well-known manner.

It is apparent that an electrical connection is provided from the negative terminal 26 through closure 11, housing 10, conductor 34, the conductive material in opening 45, support member 46, cap member 48 and contact spring 55 to contact 56; and an electrical connection is provided from positive terminal 25 through lead 23, contact 17, conductor 35 and grommet 36 to the outer surface of body 53 whereby the circuit is completed and bulb 54 will produce illumination for the dial when electrical energy is provided to terminals 25 and 26.

Figure 4:
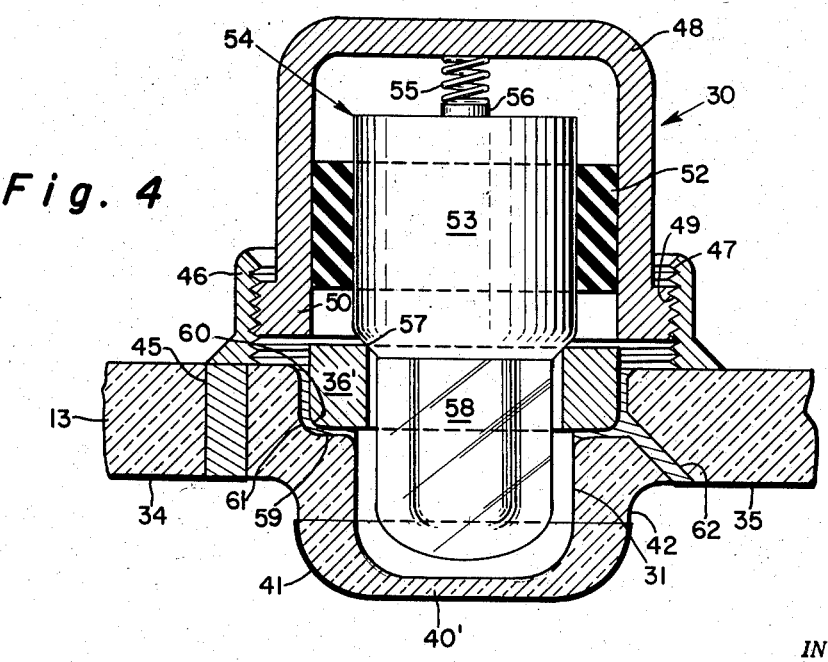
Fig. 4 is a view similar to Fig. 3 illustrating a modification of the invention.

Fig. 4 illustrates a modification of Fig. 3 wherein a separate member 40 is eliminated and the portion 40' of the device shown in Fig. 4 is formed integral with cover 13. A shoulder 59 is formed in the cover member 13 and has rounded edges as seen in Fig. 4 to facilitate manufacture thereof. The grommet 36 of Fig. 3 is replaced by a ring-shaped grommet 36' having a rounded edge 60 which is generally complementary in configuration to rounded portion 61 of shoulder 59. An opening 62 is formed at an angle in the lower surface of the cover and extends to a point adjacent metal grommet 36'. Opening 62 is filled with a metallic conductor such as solder, and since grommet 36' does not fit snugly on shoulder 59, the space between the shoulder and the grommet is also filled with metal similar to that in opening 62 to insure that the grommet is securely anchored to the cover plate and that a good electrical connection is effected between the material in opening 62 and the grommet. The lower portion of the material in opening 62 is connected to conductor 35 whereby an electrical connection is provided to the source of positive electrical potential. The remaining structure of the device shown in Fig. 4 is identical with that shown in Fig. 3. It is believed that ordinarily direct illumination of markings on the dial face and the pointer utilized therewith by means of the light emitted through area 42 of the device will be preferable. However, in some cases it may be desirable to provide edge illumination to markings on the cover 13. In such a case, it is preferred that the markings be painted on rather than engraved or etched in the lower surface of the cover in order to prevent structural weakening of the cover. If the cover is so modified, it is evident that the device in Fig. 4 will provide edge illumination to such markings since light will enter the edge of the cover surrounding opening 31 beneath grommet 36'. If it is desired to provide edge illumination in the modification shown in Fig. 3, conductor 35 may be formed as a narrow strip extending longitudinally within opening 31 rather than extending completely around the inner periphery thereof, thereby allowing light to enter the edge of the cover around opening 31 beneath the grommet.

From the foregoing, it is apparent that there is provided a new and novel instrument cover illuminating means wherein the cover and illumination fixture form a permanent hermetic seal with the casing. The bulb may be replaced or the fixture repaired without disturbing the hermetic seal. The conductors are readily installed on the lower surface of the cover, and it is merely necessary to provide a thin metallic coating in a well-known manner. The device is simple and inexpensive in construction, yet sturdy and reliable in service.

We claim:

1. An illuminated instrument comprising a hollow hermetically sealed housing, a transparent cover closing one end of said housing and having a transverse opening extending therethrough, a light fixture secured in said opening, a dish-shaped dial mounted in said housing and having a concave face positioned adjacent said cover, said fixture having a hollow cup-shaped portion formed integral with the inner face of the cover and projecting beyond the cover toward said dial, said cup-shaped portion having a circumferential translucent ring-shaped light emitting surface portion adjacent the inner surface of said cover, the remaining central surface of the cup-shaped portion extending beyond said cover being substantially opaque, said light fixture including a metal ring bonded to the outside surface of the cover and a cup-shaped metal member capable of supporting a light bulb, a plurality of electrical conductors each of which comprises a thin narrow band-like layer of metallic substance having fusible characteristics and being deposited on the inner surface of said cover in essentially co-linear relationship, means for connecting each of said conductors to a source of electrical energy, each of said conductors having an inner end electrically connected to a corresponding part of said fixture and extending radially outward from said fixture, one of said conductors having a portion extending completely around the outer circumferential surface of said cover, said one conductor portion being fused when subjected to heat to thereby become bonded to the inner surface of said housing to hermetically seal said cover to the housing.

2. An illuminated instrument in accordance with claim 1, in which one of said conductors is electrically connected to said metal ring and the other of which is electrically connected to said cup-shaped metal member, said metal ring and cup-shaped member being electrically insulated from one another and each serving as a part of the path by means of which electricity is supplied through said conductors to said light bulb.

3. A moisture-proof illuminated instrument comprising: an open-ended housing, said housing being flanged at the said open end thereof; a transparent cover lying adjacent said flange and adapted to close the open end of said housing; an electrically-operated light source centrally supported and positioned by said transparent cover; at least one elongated fusible conductor for supplying energy to said light source, said conductor extending essentially linearly from said source across one surface of said cover to and completely around the periphery of the latter, so that such peripheral conductor portion lies between said cover and the surface of said flange, said conductor being characterized in that the substance of which it is composed melts under the application of heat to thereby bond said cover to said flange and thus effect a hermetic seal between said cover and said housing.

References Cited in the file of this patent

UNITED STATES PATENTS

| | | |
|---|---|---|
| 2,141,115 | Trautner | Dec. 20, 1938 |
| 2,172,765 | Kollsman | Sept. 12, 1939 |
| 2,228,352 | Hopfield | Jan. 14, 1941 |
| 2,275,621 | Gardinor | Mar. 10, 1942 |
| 2,490,776 | Braunsdorff | Dec. 13, 1949 |
| 2,597,935 | Kiehl | May 27, 1952 |
| 2,637,802 | Roper et al. | May 5, 1953 |
| 2,696,550 | Neugass | Dec. 7, 1954 |
| 2,702,340 | Thieblot | Feb. 15, 1955 |
| 2,715,886 | Smith | Aug. 23, 1955 |

FOREIGN PATENTS

| | | |
|---|---|---|
| 999,571 | France | Oct. 3, 1951 |